United States Patent
Trichias et al.

(10) Patent No.: US 11,665,260 B2
(45) Date of Patent: May 30, 2023

(54) TRANSMITTING AND RECEIVING AN INTEREST MESSAGE SPECIFYING AN AGGREGATION PARAMETER

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Konstantinos Trichias, Athens (GR); Lucia D'Acunto, Delft (NL); Bastiaan Wissingh, Leiden (NL); Ray Van Brandenburg, Rotterdam (NL); Thomas Attema, Amersfoort (NL)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 17 days.

(21) Appl. No.: 16/500,577

(22) PCT Filed: Apr. 13, 2018

(86) PCT No.: PCT/EP2018/059487
§ 371 (c)(1),
(2) Date: Oct. 3, 2019

(87) PCT Pub. No.: WO2018/189352
PCT Pub. Date: Oct. 18, 2018

(65) Prior Publication Data
US 2021/0120098 A1    Apr. 22, 2021

(30) Foreign Application Priority Data
Apr. 14, 2017 (EP) ..................... 17166704

(51) Int. Cl.
*H04L 67/63* (2022.01)
*H04L 45/64* (2022.01)
(Continued)

(52) U.S. Cl.
CPC .............. *H04L 67/63* (2022.05); *H04L 45/64* (2013.01); *H04L 67/566* (2022.05); *H04W 4/50* (2018.02); *H04W 4/022* (2013.01)

(58) Field of Classification Search
CPC ... H04L 67/327; H04L 67/2833; H04L 67/32; H04L 45/64; H04L 67/34; H04L 67/28;
(Continued)

(56) References Cited

U.S. PATENT DOCUMENTS 9,521,076 B2 * 12/2016 Ravindran .............. H04L 61/45
2004/0267774 A1 * 12/2004 Lin ..................... G06F 16/5838
(Continued)

OTHER PUBLICATIONS

Yan, Zhiwei et al., A Novel Vehicular Information Network Architecture Based on Named Date Networking (NDN); IEEE Internet of Things Journal, vol. 1, No. 6, Dec. 2014.
(Continued)

*Primary Examiner* — Jenee Holland
(74) *Attorney, Agent, or Firm* — McDonnell Boehnen Hulbert & Berghoff LLP

(57) ABSTRACT

A first system (11) is configured to transmit an interest message, e.g. to a router (21). The interest message specifies criteria identifying data units from an area of interest, e.g. an intersection, which are to be aggregated and comprises at least one parameter specifying how the data units are requested to be aggregated. A second system (1) is configured to receive the interest message from a sender, e.g. a router (21), determine whether the system will return an aggregation of data units matching the criteria, and return a data message comprising an aggregation of data units
(Continued)

matching the criteria to the sender (21) if the processing means have determined that the system will return an aggregation of data units matching the criteria. The data units are aggregated in the data message in dependence on how the data units were requested to be aggregated.

16 Claims, 4 Drawing Sheets

(51) Int. Cl.
 *H04L 67/566* (2022.01)
 *H04W 4/50* (2018.01)
 *H04W 4/021* (2018.01)
 *H04L 67/12* (2022.01)
 *H04W 4/02* (2018.01)

(58) Field of Classification Search
 CPC ....... H04W 4/50; H04W 4/022; H04W 4/021; H04W 4/02
 See application file for complete search history.

(56) References Cited

U.S. PATENT DOCUMENTS

| | | | | |
|---|---|---|---|---|
| 2006/0133385 A1* | 6/2006 | Trossen | H04L 67/24 | 370/395.52 |
| 2009/0083243 A1* | 3/2009 | Heymans | G06F 16/2452 | |
| 2010/0094851 A1* | 4/2010 | Bent | G06F 16/2282 | 707/706 |
| 2011/0196914 A1* | 8/2011 | Tribbett | G06F 9/541 | 709/203 |
| 2013/0060962 A1* | 3/2013 | Wang | H04L 45/306 | 709/238 |
| 2013/0258878 A1 | 10/2013 | Wakikawa et al. | | |
| 2013/0301569 A1* | 11/2013 | Wang | H04L 1/1671 | 370/329 |
| 2014/0181226 A1* | 6/2014 | Xu | H04L 51/214 | 709/206 |
| 2015/0286844 A1* | 10/2015 | Mosko | H04L 67/63 | 713/167 |
| 2015/0288754 A1* | 10/2015 | Mosko | H04L 67/1095 | 709/248 |
| 2015/0288755 A1* | 10/2015 | Mosko | H04L 67/63 | 709/248 |
| 2015/0312300 A1* | 10/2015 | Mosko | H04L 69/04 | 713/171 |
| 2015/0349961 A1* | 12/2015 | Mosko | H04L 9/3247 | 713/189 |
| 2015/0350078 A1* | 12/2015 | Azgin | H04L 67/5682 | 370/392 |
| 2015/0381557 A1* | 12/2015 | Fan | H04L 61/457 | 709/245 |
| 2016/0014234 A1* | 1/2016 | Oran | H04L 47/808 | 709/203 |
| 2016/0019110 A1* | 1/2016 | Mosko | H04L 45/28 | 714/57 |
| 2016/0020990 A1* | 1/2016 | Mahadevan | H04L 45/026 | 709/204 |
| 2016/0050068 A1* | 2/2016 | Mahadevan | H04L 9/3263 | 713/155 |
| 2016/0065677 A1* | 3/2016 | Mosko | H04N 21/2347 | 709/228 |
| 2016/0087876 A1* | 3/2016 | Fan | H04L 67/60 | 709/242 |
| 2016/0142122 A1* | 5/2016 | Merlin | H04L 1/0026 | 375/267 |
| 2016/0149913 A1* | 5/2016 | Eriksson | G06F 21/6218 | 726/6 |
| 2016/0182353 A1* | 6/2016 | Garcia-Luna-Aceves | H04L 45/306 | 709/241 |
| 2016/0191257 A1* | 6/2016 | Garcia-Luna-Aceves | H04L 45/122 | 370/390 |
| 2016/0203170 A1* | 7/2016 | Mosko | G06F 16/2246 | 707/741 |
| 2016/0203322 A1* | 7/2016 | Solis | G06F 21/64 | 713/189 |
| 2016/0224799 A1* | 8/2016 | Uzun | H04L 63/045 | |
| 2016/0261575 A1* | 9/2016 | Maldaner | G06F 21/6218 | |
| 2016/0277340 A1* | 9/2016 | Mosko | H04L 51/216 | |
| 2016/0285671 A1* | 9/2016 | Rangarajan | H04L 67/327 | |
| 2016/0352614 A1* | 12/2016 | Valencia Lopez | H04L 45/60 | |
| 2016/0380986 A1* | 12/2016 | Millar | G06F 16/955 | 709/206 |
| 2017/0012867 A1* | 1/2017 | Royon | H04L 63/0414 | |
| 2017/0041420 A1* | 2/2017 | Solis | H04L 67/1097 | |
| 2017/0048346 A1* | 2/2017 | Ravindran | H04N 21/20 | |
| 2017/0064028 A1* | 3/2017 | Westphal | H04L 67/568 | |
| 2017/0078199 A1* | 3/2017 | Mosko | H04L 45/306 | |
| 2017/0085441 A1* | 3/2017 | Azgin | H04L 45/02 | |
| 2017/0085491 A1* | 3/2017 | Mosko | H04L 47/32 | |
| 2017/0093713 A1* | 3/2017 | Garcia-Luna-Aceves | H04L 45/50 | |
| 2017/0093752 A1* | 3/2017 | Mohaisen | H04L 63/083 | |
| 2017/0155738 A1* | 6/2017 | Dong | H04L 67/02 | |
| 2017/0272326 A1* | 9/2017 | Ravindran | H04L 41/12 | |
| 2017/0289316 A1* | 10/2017 | Solis | H04L 69/04 | |
| 2017/0300481 A1* | 10/2017 | Mullins | G06F 16/9024 | |
| 2017/0317933 A1* | 11/2017 | Oran | H04L 47/125 | |
| 2018/0069791 A1* | 3/2018 | Dong | H04L 45/745 | |
| 2018/0077052 A1* | 3/2018 | Moiseenko | H04L 65/80 | |
| 2018/0131673 A1* | 5/2018 | White | H04L 69/22 | |
| 2018/0241669 A1* | 8/2018 | Muscariello | H04L 61/2503 | |
| 2018/0316645 A1* | 11/2018 | Dong | H04L 61/30 | |
| 2018/0324091 A1* | 11/2018 | Dong | H04L 45/56 | |

OTHER PUBLICATIONS

PCT Search Report and Written Opinion, PCT International Application No. PCT/EP2018/059487, dated May 23, 2018, 15 pages.
European Search Report, European Patent Application No. 17166704.1, dated Sep. 27, 2017, 7 pages.
Teubler, T. et al., "Efficient Data Aggregation With CCNx in Wireless Sensor Networks", Network and Parallel Computing: [Lecture Notes in Computer Science; Lect. Notes Computer], Aug. 28, 2013, pp. 209-220.
Mosko, Marc, "CCNx 1.0 Protocol Introduction", retrieved from the internet URL:http://www.ccnx.org/pubs/hhg/1.1, Apr. 2, 2014, Sections 2-4, 10 pages.
Paillier, Pascal, "Public-Key Cryptosystems Based on Composite Degree Residuosity Classes", Eurocrypt, 1999, Springer, pp. 223-238.
Dietzel et al., In-Netwrok Aggregation for Vehicular Ad Hoc Networks, IEEE Communication Surveys & Tutorials, vol. 16, No. 4, Fourth Quarter 2014, 24 pages.
Sirsikar, et al., Issues of Data Aggregation Methods in Wireless Sensor Network: A Survey, Procedia Computer Science 49 (2015) 194-201.

* cited by examiner

TRANSMITTING AND RECEIVING AN INTEREST MESSAGE SPECIFYING AN AGGREGATION PARAMETER

CROSS REFERENCE TO RELATED APPLICATIONS

The present application is a national stage entry of, and claims priority to, PCT/EP2018/059487, filed on Apr. 13, 2018, which claims priority to European Patent Application EP 17166704.1, filed in the European Patent Office on Apr. 14, 2017, both of which are hereby incorporated in their entirety herein by reference.

FIELD OF THE INVENTION

The invention relates to a system for receiving an interest message and to a system for transmitting an interest message.

The invention further relates to a method of receiving an interest message and to a method of transmitting an interest message.

The invention also relates to a computer program product enabling a computer system to perform such methods.

BACKGROUND OF THE INVENTION

With the rise of the Internet-of-Things (IoT), billions of devices will be connected to the Internet in the coming years. Many of these devices will be mobile (e.g. wearables) and low energy (e.g. sensors) and will produce continuous streams of data. To make the enormous amount of data produced by the devices manageable, current IoT approaches employ specialized gateways and centralized data centers. A specialized gateway collects the data from the nodes in a specific IoT network and stores it, often in an aggregated form, in data centers, where the (aggregated) data can consequently be accessed by the applications that need it. These nodes may be, for example, smart meters, smart watches and wearables, and other environmental and urban "smart" systems (e.g. structural reliability sensors in dikes or humidity and temperature sensors).

Aggregation may be performed by using Information-Centric Networking (ICN). ICN is a new networking paradigm with the goal of evolving the current Internet infrastructure away from a host-oriented system towards a data-oriented system. Instead of addressing endpoints via IP addresses, in ICN data itself is addressed. By dividing data into chunks, and giving each of those chunks a unique and hierarchical name, ICN allows clients to ask the network for a given named data object, without having to worry where that data is located/stored. One of the benefits of naming data is that it allows intermediate network nodes, such as switches and routers, to opportunistically cache data as it passes by. This in turn allows for content to be transported more efficiently over the Internet and for more effective use of the network resources.

Current ICN architectures have two elementary types of messages at their core: interest messages and data messages. When an application wants to retrieve a particular data object, it sends out an interest message for that data object. The most important part of this interest message is the name of the object, or, in cases where the full name of the object is not known, a prefix.

An example of an ICN architecture that supports aggregation is disclosed in "A Novel Vehicular Information Network Architecture Based on Named Data Networking (NDN)", Yan et al., Z. Yan, S. Zeadally, and Y. J. Park, IEEE Internet of Things Journal, Vol. 1, 2014. In this ICN architecture, location-based names and a hierarchy of specialized aggregators are used. An upper-level aggregator (e.g. at city level) collects data from lower-level (e.g. at district and street level) aggregators by transmitting interest messages. The lower-level aggregators segregate the interest message into multiple interest messages for lower levels, aggregate resulting data messages and transmit the aggregated data to the higher-level aggregator.

A drawback of this architecture is that it is customized not only for the specific IoT network, but also for the specific applications the IoT devices are meant/envisioned for. Aggregating data to meet a specific application's requirements also limits the way in which this data may be used by other, future applications.

SUMMARY OF THE INVENTION

It is a first object of the invention to provide a system for receiving an interest message, which enables data aggregation with a high degree of customization.

It is a second object of the invention to provide a system for transmitting an interest message, which enables data aggregation with a high degree of customization.

It is a third object of the invention to provide a method of receiving an interest message, which enables data aggregation with a high degree of customization.

It is a fourth object of the invention to provide a method of transmitting an interest message, which enables data aggregation with a high degree of customization.

According to the invention, the first object is realized in that the system for receiving an interest message comprises processing means configured to receive an interest message from a sender, said interest message specifying criteria identifying data units from an area of interest which are to be aggregated and comprising at least one parameter specifying how said data units are requested to be aggregated, determine whether said system will return an aggregation of data units matching said criteria, and return a data message comprising an aggregation of data units matching said criteria to said sender if said processing means have determined that said system will return an aggregation of data units matching said criteria, said data units being aggregated in said data message in dependence on how said data units were requested to be aggregated.

In this way, the requester from which the interest message originates is able to specify exactly what aggregation it is interested in instead of being limited to what the specialized gateway or data center is able to provide. This results in data aggregation with a high degree of customization. The system does not necessarily have to store any data units matching the criteria itself. Even if there is no data unit stored in memory matching the criteria, the system may be able to request the individual data units from neighboring nodes, and then perform the aggregation. The processing means may determine that the system will return an aggregation of data units matching the criteria if the system is technically capable of and in a position to return the requested aggregation, for example. The processing means may determine that the system is not in a position to return the requested aggregation if it doesn't want to use too much energy and/or is located far away from an identified geographical area, for example.

Said system may be a router in a network or a mobile phone, for example. Said aggregation of data units may be a sequence of said data units or a result of an aggregation function being performed on said data units, for example. A data unit is preferably a data value. A data unit may be a sensor value, for example. Said area may be a geographical area or a non-geographical area. As an example of the latter, the data units from the area of interest may be the throughput values of the users in a mobile communication network. The terms "data unit" and "information unit" are used interchangeably in this specification. Said sender may be the requestor or an intermediate node forwarding the interest message, for example.

In a first embodiment, the processing means determine that the system will not return an aggregation of data units matching the criteria if the processing means are not able to aggregate the data units in the manner specified in the at least one parameter of the interest message. In a second embodiment, the processing means will try to aggregate the data units in the manner specified in the at least one parameter of the interest message, but may instead aggregate the data units in the feasible manner that is closest to the manner specified in the at least one parameter of the interest message if it is not able to aggregate the data units in the specified manner. For example, if an average of 10 values is requested, but only 8 values are available, the processing means may be configured to determine the average of 8 values instead and indicate in the returned data message (that includes the average) that the average has been determined from 8 values.

Said processing means may be configured to forward said interest message to another system if said processing means have determined that said system will not return an aggregation of data units matching said criteria. If the processing means determine that it is not capable of and/or not in a position to return a requested aggregation, the system will not return any data message, but forward the interest message to another system, e.g. the next node in the path of the interest message. By enabling any node in the network to take the role of aggregator, a higher efficiency and a higher data availability may be achieved. Since the tasks of data aggregation are distributed across different nodes in the network, even if one fails, there will be another one participating in the data aggregation process (higher degree of network robustness).

Said at least one parameter may specify whether said aggregation is requested to comprise a sequence of said data units (also referred to as syntactic aggregation) or to comprise a result of an aggregation function being performed on said data units (also referred to as semantic aggregation). This allows a requesting device to perform the aggregation itself or have the aggregation performed somewhere else than on the system, e.g. because the system does not support the desired aggregation function. This contributes to a high degree of customization.

In a first embodiment, the processing means determine that the system will not return an aggregation of data units matching the criteria if the processing means area not able to perform an aggregation function on data units matching the criteria, e.g. because the processing means do not have enough processing power or because the criteria specify a minimum number of data units to be aggregated and the processing means are not able to obtain this minimum number of data objects. In a second embodiment, the processing means return a sequence of the data units instead of a result of an aggregation function being performed on the data units if the processing means are not able to perform an aggregation function on data units matching the criteria.

Said data units matching said criteria may comprise numerical values. Sensors typically output numerical values, often on a periodic basis, and typically multiple sensors are present in an area of interest. In these cases, aggregation of numerical values is therefore beneficial.

Said at least one parameter may identify said aggregation function. The use of an aggregation function reduces the amount of data that needs to be returned to the sender, because the individual data units/values do not need to be returned, and thereby results in a more efficient use of network bandwidth. Allowing the requester to specify the aggregation function contributes to a high degree of customization.

Said aggregation function may comprise one of: count, maximum, median, average, minimum, most often appearing value, probability distribution, and percentage of cumulative distribution, for example. These are functions that are beneficial for many kinds of applications. Other aggregation functions may additionally or alternatively be used.

The same parameter or separate parameters may specify whether syntactic or semantic aggregation is requested and identify said aggregation function. As an example of the former, this parameter may specify "syntactic", "median", "average", etc.

Said processing means may be configured to include information in said data message describing how and/or when said aggregation of said data units was performed. Information describing how the aggregation of the stored units was performed may comprise the function used, the units of the response value, the number of samples used for the aggregation, representation format of the data value, and IDs of network nodes that contributed to the aggregation, for example. This is especially beneficial if the interest message left some freedom in how to perform the aggregation or if not all requirements specified in the interest message could be met for some reason. For example, an interest message may specify that it wants to receive the average speed of cars on a certain road without specifying whether it wants to receive the speed in kilometers per hour or miles per hour. In this case, it is very beneficial to include information describing whether the returned data value represents a speed in kilometers per hour or a speed in miles per hour.

Said processing means may be configured to obtain at least one of said data units from at least one further system. If the system does not store sufficient data units, e.g. in its cache, to return an aggregation of data units matching the criteria or if the processing means determine that at least one further system has or may have certain data units that are not stored on the system, it is beneficial to try to obtain data units from the at least one further system.

Obtaining said at least one of said data units from said at least one further system may comprise transmitting one or more interest messages for said at least one of said data units to said at least one further system, said one or more interest messages instructing said at least one further system to include said at least one of said data units, e.g. data values, in the name of one or more data messages. This is beneficial in case the system does not know the format of the payload of the data message and cannot process this payload. The one or more data messages may comprise the same data units in their payload or their payload may be empty, for example. It may further be beneficial to encrypt the data unit in the name of the one or more data messages. For security reasons, some applications may require to not have the data value readable (i.e. unencrypted) in the data message name, since all intermediate nodes it travels through then become aware of the contents of the message, even if they don't have authorization for it. Homomorphic encryption may be used, for example. Homomorphic encryption enables manipulation of values in the encrypted domain, and hence the system may be able to compute the aggregated value on the encrypted individual values and return it to the sender, without however having access to the value itself.

Said interest message may specify a time frame within which said aggregation of data units matching said criteria needs to be returned to said sender and said processing means may be configured to determine whether said system is able to return a data message comprising an aggregation of data units matching said criteria to said sender within said specified time frame. This may be beneficial in a time-critical situation.

Said interest message may specify a minimum amount of data units matching said criteria that should be aggregated and said processing means may be configured to determine whether said system is able to return a data message comprising an aggregation of at least said minimum amount of data units matching said criteria. This may be useful when the requester of the aggregation has certain requirements with regard to the reliability of the aggregation, i.e. when the requester wants to make sure that the returned aggregation is sufficiently representative.

Said processing means may be configured to receive a data message and to extract a data object from the name of said received data message. By including data values that may be useful for aggregation in the name of data messages instead of in the payload of data messages, the system does not need to know the format of the payload and/or does not need to decrypt the payload.

According to the invention, the second object is realized in that the system for transmitting an interest message comprises processing means configured to transmit an interest message, said interest message specifying criteria identifying data units from an area of interest which are to be aggregated and comprising at least one parameter specifying how said data units are requested to be aggregated.

According to the invention, the third object is realized in that the method of receiving an interest message comprises receiving, on a system, an interest message from a sender, said interest message specifying criteria identifying data units from an area of interest which are to be aggregated and comprising at least one parameter specifying how said data units are requested to be aggregated, determining whether said system will return an aggregation of data units matching said criteria, and returning a data message comprising an aggregation of data units matching said criteria to said sender if it has been determined that said system will return an aggregation of data units matching said criteria, said data units being aggregated in said data message in dependence on how said data units were requested to be aggregated. Said method may be performed by software running on a programmable device. This software may be provided as a computer program product.

According to the invention, the fourth object is realized in that the method of transmitting an interest message comprises transmitting an interest message, said interest message specifying criteria identifying data units from an area of interest which are to be aggregated and comprising at least one parameter specifying how said data units are requested to be aggregated. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations comprising: receiving, on a system, an interest message from a sender, said interest message specifying criteria identifying data units from an area of interest which are to be aggregated and comprising at least one parameter specifying how said data units are requested to be aggregated, determining whether said system will return an aggregation of data units matching said criteria, and returning a data message comprising an aggregation of data units matching said criteria to said sender if it has been determined that said system will return an aggregation of data units matching said criteria, said data units being aggregated in said data message in dependence on how said data units were requested to be aggregated.

A non-transitory computer-readable storage medium stores at least a second software code portion, the second software code portion, when executed or processed by a computer, being configured to perform executable operations comprising: transmitting an interest message, said interest message specifying criteria identifying data units from an area of interest which are to be aggregated and comprising at least one parameter specifying how said data units are requested to be aggregated.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
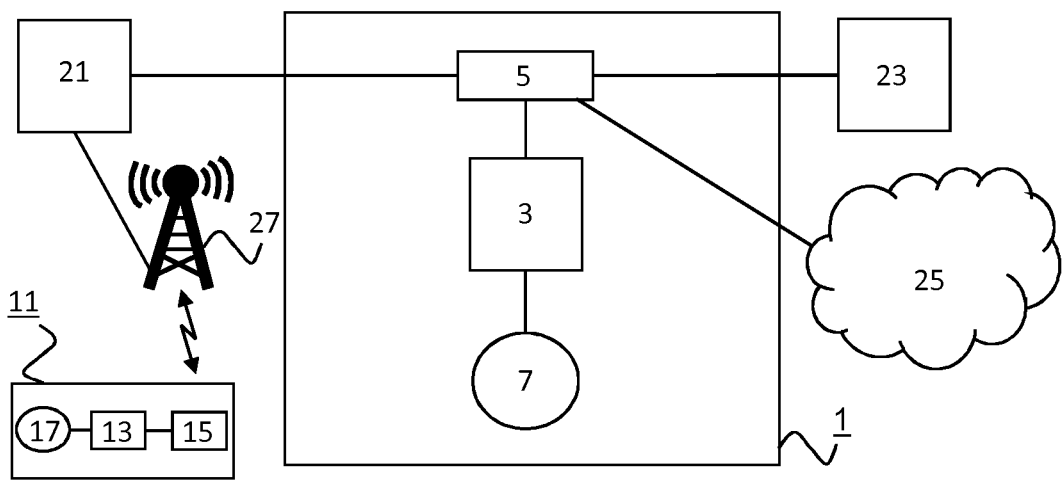
FIG. 1 is a block diagram of embodiments of the systems of the invention.

An embodiment of the system for receiving an interest message is shown in FIG. 1. The system 1 comprises processing means 3 configured to receive an interest message from a sender, e.g. a router 21. The interest message specifies criteria identifying data units from an area of interest which are to be aggregated and comprises at least one parameter specifying how the data units are requested to be aggregated. The processing means 3 are further configured to determine whether the system 1 will return an aggregation of data units matching the criteria and return a data message comprising an aggregation of data units matching the criteria to the sender, e.g. the router 21, if the processing means 3 have determined that the system 1 will return an aggregation of data units matching the criteria. The data units are aggregated in the data message in dependence on how the data units were requested to be aggregated.

The system 1 may be a network router, for example. The system 1 may be a dedicated router or may be a user device performing network routing, for example. The system 1 may be a mobile device, for example. The processing means 3 may comprise one or more general-purpose processors and/or one or more application specific processors. The processing means 3 may comprise one or more ARM processors, for example. In the embodiment shown in FIG. 1, the system 1 further comprises a memory 7. The memory 7 may comprise one or more magnetic hard disks, one or more optical drives, and/or one or more solid state memories, for example. The memory 7 may be used to store data units (as part of data message and/or separately) and/or other information like a Pending Interest Table (PIT) and a Forwarding Information Base (FIB). The collection of stored data units may be referred to as a Content Store (CS). The router 21 may comprise processing means configured in the same way as the processing means 3 of system 1. The router 21 may be a dedicated router or may be a user device performing network routing.

In the embodiment shown in FIG. 1, the system 1 further comprises a communication module 5 with a plurality of communication interfaces. The communication module 5 may comprise one or more optical ports, one or more wireless transceivers and/or one or more Ethernet ports, for example. The communication module 5 may comprise one or more internal interfaces, for example. If the system 1 is running both a client and a server, the client and the server may use an internal communication interface to exchange interest messages and data messages, for example. An internal communication interface may comprise a Unix domain socket and/or an inter-process communication socket, for example. In the embodiment of FIG. 1, the processing means 3 uses communication interfaces of the communication module 5 to communicate with routers 21 and 23 and with other equipment in the Internet 25.

In the embodiment of FIG. 1, the processing means 3 are configured to obtain at least one of the data units from at least one further system, e.g. a router 23. Obtaining the at least one of the data units from the at least one further system, e.g. router 23, comprises transmitting one or more interest messages for the at least one of the data units to the at least one further system, e.g. router 23. In this embodiment, the one or more interest messages instruct the at least one further system, e.g. router 23, to include the at least one of the data units in the name of one or more data messages. The router 23 may comprise processing means configured in the same way as the processing means 3 of system 1. The router 22 may be a dedicated router or may be a user device performing network routing.

FIG. 1 also shows an embodiment of the system for transmitting an interest message. The system 11 comprises processing means 13 configured to transmit an interest message. As previously described, the interest message specifies criteria identifying data units from an area of interest which are to be aggregated and comprises at least one parameter specifying how the data units are requested to be aggregated. In the embodiment shown in FIG. 1, the system 11 transmits the interest message to router 21 via base station 27 of a mobile communication network. The router 21 forwards the interest message to system 1.

The system 11 may be a user device, for example. The system 11 may be a laptop, tablet, mobile phone or a device embedded in a vehicle, for example. The system 11 may comprise a display, e.g. for displaying traffic information or other sensor information. The processing means 13 may comprise one or more general-purpose processors and/or one or more application specific processors. The processing means 13 may comprise an ARM or Qualcomm processor, for example. In the embodiment shown in FIG. 1, the system 11 further comprises a communication interface 15. The communication interface 15 may comprise a wireless data (e.g. cellular and/or WiFi) transceiver for example. The system 11 may further comprise other components typical for a user device, e.g. a power supply.

In the embodiment shown in FIG. 1, the device 11 further comprises a memory 17. The processor 13 may be configured to store an entry corresponding to the interest message in a Pending Interest Table (PIT) in the memory 17. The processor 13 may further be configured to receive a data message comprising the aggregated data units aggregated by the system 1. The processor 13 may further be configured to remove the entry from the PIT in the memory 17 or deactivate the entry in the PIT in the memory 17 if the data message is received. The memory 17 may comprise one or more magnetic hard disks, one or more optical drives, and/or one or more solid state memories, for example. Deactivating the entry in the memory 17 may comprise setting a field of the entry titled "active" to "no", setting a field of the entry titled "satisfied" to "yes" or setting a field of the entry titled "deactivated" to "yes", for example.

Figure 2:
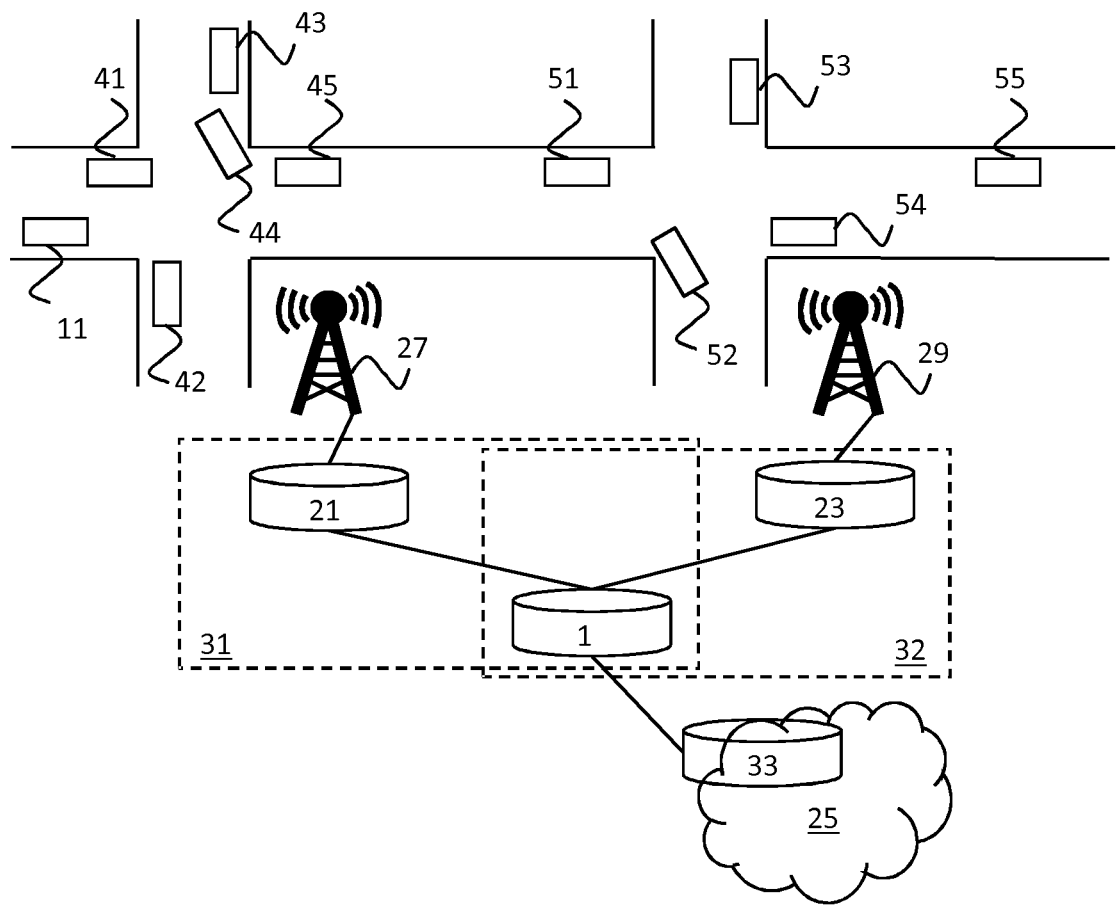
FIG. 2 is a block diagram of more detailed embodiments of the systems of FIG. 1.

FIG. 2 shows more detailed embodiments of the systems of FIG. 1. In the embodiment shown in FIG. 2, the system 11 is used in a vehicle. For example, the system 11 is a vehicle, is embedded in a vehicle or may be a (e.g. mobile) device used in a vehicle. System 11 and vehicles 42 to 45 are located at or near a first intersection and transmit their position and possibly other information like their speed to the router 21 via base station 27. Vehicles 51 to 55 are located at or near a second intersection and transmit their position and possibly other information like their speed to the router 23 via a base station 29. One or more of the vehicles 42 to 45 and 51 to 55 may comprise processing means configured in the same way as the processing means 13 of system 11.

The system 11 and the vehicles 42 to 45 and 51 to 55 may transmit their position (and possibly other information) in a data message in response to an interest message, for example. The router 21 and the router 23 may forward some of or all the received data messages to system 1, e.g. because the interest messages were received from the Internet 25 or because it was system 1 that transmitted the interest messages. The processing means of the routers 21 and 23 and of the system 1 may be configured to extract a data unit, e.g. the position of a vehicle, from the name of the received data message or from the payload of the received data message.

In the embodiment shown in FIG. 2, the system 11 of FIG. 1 displays traffic information to the user of system 11. The vehicle that comprises system 11 is approaching the first intersection and the system 11 displays traffic information regarding the first intersection, e.g. how busy the first intersection is and/or how long the user is expected to have to wait for the traffic light to turn green. System 11 may know that the vehicle will proceed to the second intersection, e.g. because it is part of a calculated route, and may try to obtain information regarding the second intersection. Alternatively, the system 11 may try to obtain information regarding all intersections that the vehicle could proceed to. The system 11 tries to obtain information regarding the second intersection by transmitting an interest message which specifies the location of the second intersection and comprises at least one parameter specifying how the data units are requested to be aggregated.

The at least one parameter may specify whether the aggregation is requested to comprise a sequence of the data units or to comprise a result of an aggregation function being performed on the data units and/or may identify the aggregation function. For example, it the system 11 wants to display the positions of the vehicles 51 to 55 on a display, it may specify in the interest message that it wants to receive positions of vehicles at or near the second intersection and that it wants to receive a sequence of these positions (i.e. a syntactic aggregation of these positions). If the interest message identifies an aggregation function (e.g. "count" or "maximum") without explicitly specifying that the aggregation is requested to comprise a result of an aggregation function (e.g. when it is only possible to specify "syntactic" as parameter and not "semantic"), it is assumed that the aggregation is requested to comprise a result of the aggregation function (i.e. is a semantic aggregation).

The aggregation function may comprise one of count, maximum, median, average, minimum, most often appearing value, probability distribution, and percentage of cumulative distribution, for example. For example, the system 11 may specify in the interest message that it wants to receive the average speed of the vehicles at or near the second intersection to determine how busy the second intersection is.

When the router 21 receives the interest message from the system 11, the router 21 determines that it will not return an aggregation of data units matching the criteria, because the second intersection is covered by network equipment in area 32, while the router 21 is part of area 31. The router 21 therefore forwards the interest message to system 1 of FIG. 1. In an alternative embodiment, the router 21 is a conventional router which does not recognize interest messages that request an aggregation and forwards the interest message for this reason.

When the system 1 receives the interest message from the router 21, the processing means 3 of the system 1 first determine whether the system 1 will return an aggregation of data units matching the criteria. The interest message may specify a time frame within which the aggregation of data units matching the criteria needs to be returned to the sender and the processing means 3 may be configured to determine whether the system 1 is able to return the data message comprising the aggregation of data units matching the criteria to the sender within the specified time frame. The interest message may specify a minimum amount of data units matching the criteria that should be aggregated and the processing means 3 may be configured to determine whether the system 1 is able to return the data message comprising the aggregation of at least the minimum amount of data units matching the criteria.

If the interest message identifies an aggregation function and the system 1 e.g. does not have sufficient processing power or not enough battery power (in case system 1 comprises a battery) to carry out an aggregation function, it may forward the interest message to another system or it may return a sequence of the data units, for example. In the embodiment of FIG. 2, the system 1 determines that it will return an aggregation of data units matching the criteria and returns a data message comprising an aggregation of data units matching the criteria to the router 21.

In the embodiment of FIG. 2, the processing means 3 of system 1 are configured to include information in the data message describing how and/or when the aggregation of the data units was performed in certain situations. For example, the interest message may request the speed of vehicles without a unit of measurement and the unit of measurement (e.g. miles per hour or kilometers per hour) may therefore be indicated in the returned data message. In an alternative embodiment, the processing means 3 of system 1 are configured to always include how and/or when the aggregation of the data units was performed.

In the embodiment of FIG. 2, the processing means 3 of system 1 are configured to forward the interest message to another system if the processing means 3 have determined that the system 1 will not return an aggregation of data units matching the criteria. For example, if the interest message would have specified a location not covered by network equipment in either area 31 or area 32, the system 1 would have forwarded the interest message to router 33 on the Internet 25.

if the processing means 3 have determined that the system 1 will return an aggregation of data units matching the criteria and it does not have all these data units, e.g. it does not have the speed of vehicles 53 and 54, the processing means 3 may be configured to collect the data units that it does not have by sending interest messages to router 23. This is shown in more detail in FIG. 3. After the processing means 3 has determined that it will receive no more data messages from router 23 (e.g. it has received the speeds of vehicles 53 and 54 from router 23), it will average all the vehicles' speeds and return the average to router 21, which will return it to vehicle 11.

In the embodiment of FIG. 2, the invention is used for providing real-time personalized traffic information. The invention may also be used for other applications. For example, in a smart city scenario, there will likely be roads, traffic lights and buildings equipped with sensors, monitoring for example temperature, structural reliability, and humidity. Furthermore, all these sensors may be mounted on nodes of a more ad-hoc/mobile nature, such as cars, bicycles, and pedestrians with wearable devices. In this scenario, governmental institutions or building/manufacturing companies might like to monitor the data from these sensors and request, for example, the value of the total number of structural load sensors in a building.

The aggregation may be requested to comprise a sequence of the data units or to comprise a result of an aggregation function being performed on the data units. The former is also referred to as syntactic aggregation and the latter is also referred to as semantic aggregation. These types of aggregation may be implemented as follows:

Syntactic aggregation. The system performing the data aggregation will create a new data message whose content is a sequence of individual values, e.g. contained in data messages. Essentially, this method does not actually compute the aggregate, but collects the values satisfying the request which can then be used by the requester to compute the aggregate. The advantage of this method is that the aggregator system does not need to be aware of what is contained in the data messages.

Semantic aggregation. The system performing the data aggregation will apply the aggregation function on the values collected. If the aggregator system may not be able to manipulate the data in the data message, e.g. because it does not know its format, the data value may be contained in the name of the data message. The content of the data message will provide the metadata necessary to the requester to interpret the aggregated value (e.g. measurement unit and representation format integer, float, etc.). For security reasons, some applications may require to not have the data value unencrypted in the data message name, since then all intermediate nodes it travels through become aware of the contents of the message (even if they don't have authorization for it). In those cases, some sort of encryption may be used. For example, homomorphic encryption which enables manipulation of values in the encrypted domain, and hence the aggregating system will be able to compute the aggregated value on the encrypted individual values and return it to the requester, without however having access to the value itself.

The name specified in the interest message specifies at least part of the context or area of interest. The context or area of interest defines the context or area where the values for the aggregate need to be taken from, for example the geographical/location area or the producer company, and is usually associated with the naming scheme used for an IoT application. For example: /tno/newbabylon/10floor/room/1/sensor/temperature, meaning that all the temperature values in room 1 on the 10th floor of New Babylon are eligible responses to such a request, i.e. that the context of interest is room 1 on the $10^{th}$ floor of new Babylon and that the data of interest in that context is temperature values. One could also use a range name component to specify the context of interest:

/latitude/{[40.5:45.5]}/longitude/{[17.0:18.5]}/sensor/temperature.

Different techniques for addressing specific geographical locations may be used in this parameter (e.g. GPS coordinates, military grids, etc.) or for addressing the producer.

In order to cater for different applications with different requirements, one or more of the following data aggregation parameters may be used:

Aggregation function. This parameter defines the sort of aggregate that the requester (a system that issues the interest message) wishes to obtain. Examples are: average (arithmetic mean), count, maximum, median, minimum, mode (the value that appears most often), sum.

Time-frame of interest. This parameter defines the time range within which a data value must be produced in order that it may be taken into account for the aggregate. For example, if a system specifies range of interest X seconds, then all the data values created within the range: [time of receipt of interest, time of receipt of interest –X seconds] are viable candidates for aggregation. It may also be possible to specify a time range as a tuple: [time start, time end], and there may be multiple ranges specified in a message (e.g. if an application wants to know a value within a certain time range across multiple days).

Scope of aggregation. This parameter defines requirements of the requester regarding the aggregation request. For example, this parameter may define that the aggregated data needs to be delivered within a certain time-frame (e.g., if the requester is in a time-critical situation) and the aggregated data must satisfy some conditions, such as using at least X individual values, etc.

Furthermore, the type of aggregation (semantic or syntactic) and/or a part of the context or area of interest may also be specified in one or more data aggregation parameters.

Figure 3:
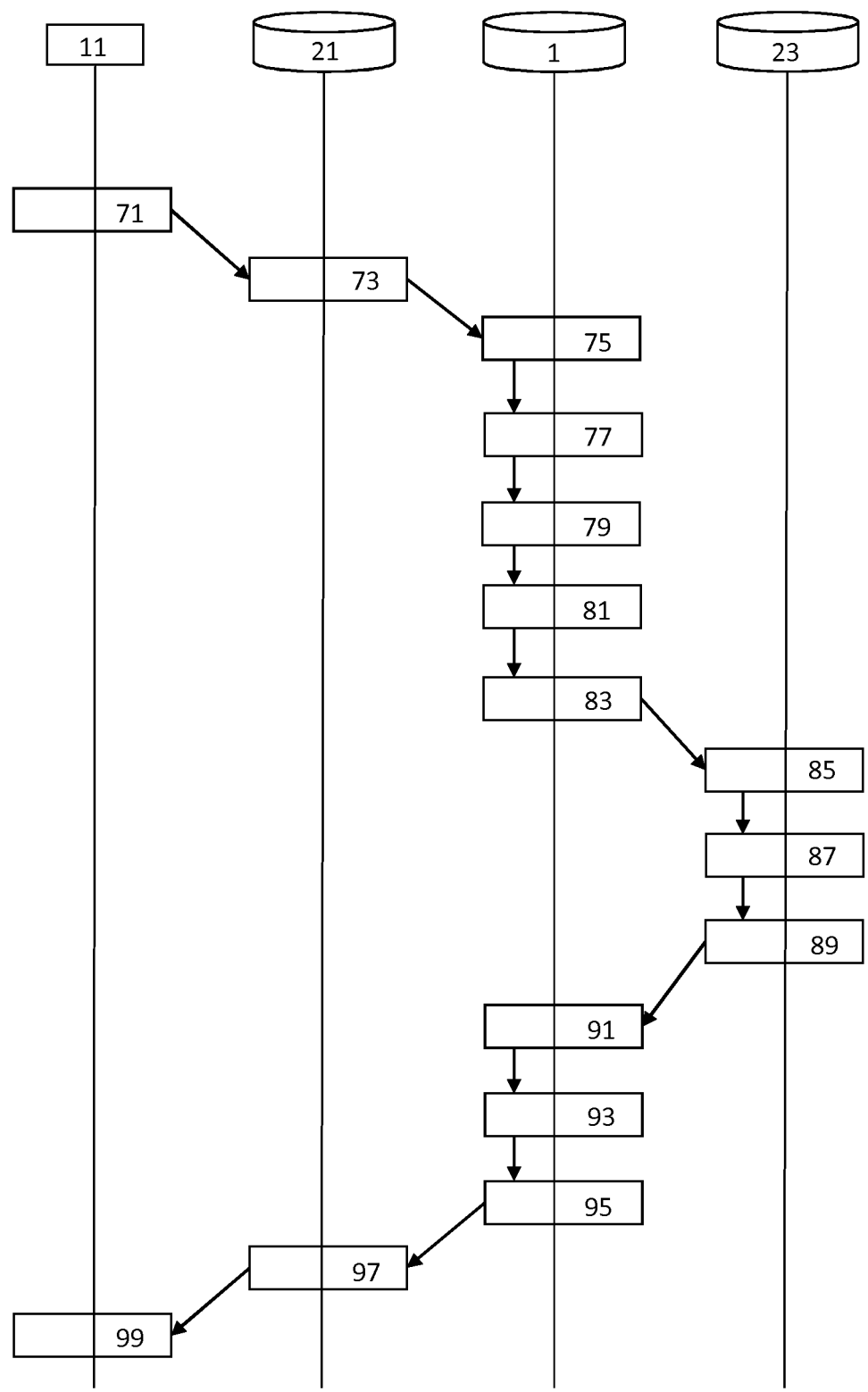
FIG. 3 is a first flow diagram illustrating embodiments of the methods of the invention.

Embodiments of the methods of transmitting and receiving an interest message are shown in FIG. 3. A step 71 comprises the system 11 transmitting an interest message. The interest message specifies criteria identifying data units from an area of interest which are to be aggregated and comprises at least one parameter specifying how the data units are requested to be aggregated. For example, the system 11 may specify in the interest message that it wants to receive the average speed of the vehicles at or near the second intersection to determine how busy the second intersection is. A step 73 comprises the router 21 forwarding the interest message to the system 1, e.g. because it is a conventional router or because it has determined that it will not return an aggregation of data units matching the criteria.

A step 75 comprises the system 1 receiving the interest message from the router 21. A step 77 comprises the system 1 determining whether the system will return an aggregation of data units matching the criteria. For example, the system 1 determines whether it is close enough to a geographical area specified in the interest message to return the aggregation and/or whether its battery level is high enough to return the data aggregation.

A step 79 comprises the system 1 checking its Content Store (in memory 7) whether it has enough data units in its Content Store to fulfil the request for the data aggregate, depending on what is specified by the '"scope of aggregation" parameter. The Content Store of system 1 may even store no data units matching the criteria. A step 81 comprises the system 1 determining the need for some data units not stored in its Content Store that it wants to request from one or more other systems, e.g. its neighbors or the sensors themselves. A step 83 comprises the system 1 sending individual interest messages for each determined data unit or one interest message requesting all determined data units to router 23.

A step 85 comprises the router 23 receiving the interest message(s) from the system 1. A step 87 comprises the router 23 obtaining a data unit having the name specified in the interest message from the Content Store of the router 23 for each/all received interest message(s). A step 89 comprises the router 23 returning each data unit in a data message or all data units in a data message to the system 1.

A step 91 comprises the system 1 receiving data messages from the router 23 in response to the interest messages. A step 93 comprises the system 1 aggregating any data units obtained from its Content Store and the data units received from router 23. The data units are aggregated in dependence on how the data units were requested to be aggregated.

A step 95 comprises the system 1 creating and returning a data message comprising an aggregation of any data units obtained from its Content Store and the data units received from the router 23 to the router 21. The data units may be included in the name or in the payload of the data message. A step 97 comprises the router 21 forwarding the data message to the system 11. A step 99 comprises the system 11 receiving the data message.

Figure 4:
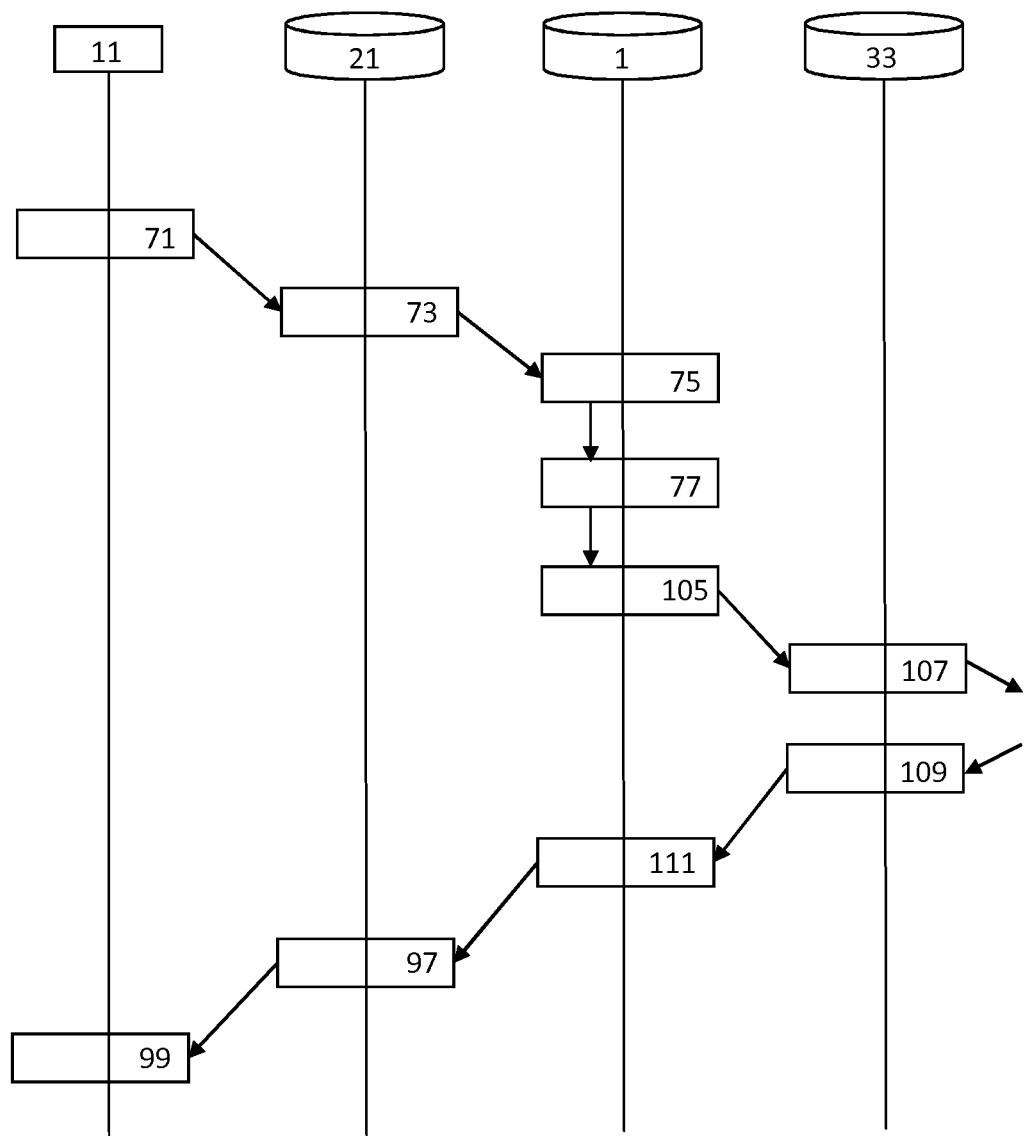
FIG. 4 is a second flow diagram illustrating the embodiments of FIG. 3.

FIG. 4 shows the steps performed if the system 1 determines that it will not return an aggregation. For example, assuming that the interest message specifies a geographical area which is not covered by network equipment in region 31 or 32 of FIG. 2, the system 1 determines that it will not return an aggregation in step 77.

A step 105 is then performed (instead of step 79 of FIG. 3) after step 77. Step 105 comprises storing an entry corresponding to the interest message in a Pending Interest Table (PIT) in memory 7 of system 1 and forwarding the interest message to the next uplink node, router 33. A Forwarding Information Base (FIB) may be used to determine which further system(s) to forward an interest message to. A FIB has a similar purpose in Named Data Networking as in Open Shortest Path First (OSPF) routing, but for names instead of IP addresses. The entry in the PIT specifies that the interest message was received on an interface corresponding to router 21.

A step 107 comprises the router 33 forwarding the interest message to another system. A step 109 comprises the router 33 forwarding a data message comprising the aggregation received from the other system to the router 1. A step 111 comprises the system 1 receiving the data message. The system 1 looks up the interest entry corresponding to the received data message in the PIT, forwards the data message on the interface specified in the entry, i.e. to router 21, and deletes the entry in the PIT. Steps 97 and steps 99 are performed in the same way as shown in FIG. 3. Steps 73 and 107 may also comprise storing an entry in a PIT stored in routers 21 and 33, respectively. Steps 97 and 109 may also comprise looking up and deleting the entry in the PIT stored in routers 21 and 33, respectively.

In the following section, examples of how to implement the invention in the ICN architecture are described, applicable—but not limited to—both the NDN and the CCNx variants. ICN architectures typically use Type-Length-Value (TLV) encoding. In these examples, the conventional interest and data message are extended in order to, respectively, request and provide a data aggregation. These extensions are described below.

A) Interest Message

The interest message used by ICN nodes may be extended to allow ICN nodes to request aggregations of data units in addition to individual data units. There are two possible solutions to implement this:

1) Define a New TLV Element:

There are several TLV reserved codes to be used within ICN (both in NDN and in CCNx) in order to make ICN forward compatible and to be able to accommodate future, yet to be defined networking needs. By using a new TLV element which will be dedicated/assigned to data aggregation and appending it to the rest of the TLV elements of the interest message, all the nodes implementing ICN will be able to identify that this a special interest message containing a TLV element which refers to a data aggregation request and will be able to distinguish it from the normal interest messages which do not contain such a TLV element.

If an interest message with a new TLV aggregation element is used, then the previously mentioned aggregation parameters might be included in the interest message as separate fields. These fields could be defined as new TLV sub-elements of the TLV aggregation element, or, in the case of Named-Data Networking (NDN), the pre-existing Selectors TLV of interest messages could be used to carry the aggregation parameters (Selectors TLVs are a block of TLV elements that may be present in an interest message, and which contain information that can be used to further specify details of the data unit one is interested in), which exists in current interest messages. As many new TLV (sub)elements as necessary could be defined in order to cater for all the needs of the aggregation process. However, it is preferable to keep the list of TLV types as small as possible, as there is normally a limit on the amount of new TLV elements that can be defined and the longer the list, the longer it will take to process the list and find the corresponding type and action of the TLV. It may even be possible to define only one TLV aggregation element which contains all the necessary parameters in a fixed, predetermined order, in which case all the ICN nodes would have to be aware of the order. This approach has the advantage that the messages are easier to parse (due to their fixed structure), however it also poses flexibility constraints on the interest messages to be constructed.

Each of the aggregation related TLV elements may be defined as compulsory, optional or conditional compulsory.

An example of the structure of such an aggregation TLV element is shown below:

AggregationComponent: TRUE
Aggregation.Type: Semantic
Aggregation.Function: Average
Aggregation.TimeFrame: $T_0$-120 seconds
Aggregation.Context: Lat=45/Long=52
Aggregation.Scope: Time tolerant When an ICN node reads the above TLV element, it should be able to understand what kind of aggregation it needs to perform and to respond with a data message with the requested aggregated data units or an aggregated value of these data units. A node that does not recognize this specific TLV type does not discard the interest message, but forwards it along the path.

2) Embed the Aggregation Request in the Name of a Conventional Interest Message

In this alternative the conventional interest message format (i.e. same TLV type) is used, but the name used in the interest message is enriched with one or more special characters that indicates that this is an aggregation request and which provides the aggregation parameters. This could be achieved by using a special reserved character, e.g. as follows:

./Highway1/North/Speed/%"Type","Function","TimeFrame","Context","Scope"%

In the above example the special character "%" is used to indicate the start and the end of the aggregation parameter list. If an interest name contains such a character, then it is understood by the ICN node that this is an aggregation request and not a normal interest message. The aggregation is preferably requested for the attribute that directly proceeds the aggregation parameter list, in this case the attribute "Speed". The naming is constructed like this for a number of reasons:

a. The aggregation parameter list should be at the end in order to remain backward compatible with nodes that are not aggregation enabled and don't understand the special characters reserved for it. In this case, such a node would still be able to perform longest prefix matching up until the sub-element "Speed" and forward it to the appropriate node along the path even if it doesn't understand the meaning of "%".

b. If the attribute that the aggregation concerns is always put in the name right before the parameter list then there is no need to use special characters to indicate which attribute the aggregation concerns. If however, for some reason this attribute cannot be placed at the end of the name, then another special character could be used to indicate which attribute is the aggregation about, e.g.

/North/@Speed/lat{51:53}/long{42:45}/%"Type", "Function","TimeFrame","Scope"%

In this example the special character "@" is used to indicate that the aggregation requests concerns the Speed. It must be noted that such an addition might limit the backward compatibility of the naming scheme, in the extremely unlikely case that some of the ICN nodes are not implementing the latest ICN protocol and are hence unaware of the significance of the special characters.

c. The number of parameters in the parameter list can remain extendible in order to cater for future expansions of the aggregation scheme.

d. The parameters within the parameter list can be placed in a pre-determined order. In this case, only the parameter values need to be mentioned in the name (and not the parameter types), since all the compatible ICN nodes would be aware of the pre-determined order of the parameters, e.g.

./North/@Speed/lat{51}/long{45}/%"Semantic","Avg", "$T_0$-120sec","Time Critical"%

In this case, the ICN nodes are aware that the agreed order of parameters is 1. Type, 2. Function, 3. Time Frame and 4. Scope and can thus assign the appropriate value to the appropriate parameter.

In a case that a more flexible scheme is desired then the order of the parameters can be dynamic but the parameter list would have to include indicators per parameters, for instance: /North/@Speed/lat{51}/long45}/%"Type=Semantic","Function=Avg","TimeFrame=$T_0$-120sec","Scope=Time Critical"%

This approach provides a more flexible naming scheme but it comes at the cost of extra overhead in the name and possibly more complex name parsing schemes.

e. As can be seen from the previous example, a part of the context or area of interest may be included in the parameter list or the entire context or area of interest may be included in the normal name. For example, the latitude and longitude values may be included in the parameter list as the values of the "Context" field, or may be included in the name using a Range Name Component.

B) Data Message

The data message to be used for responding to an aggregation interest message and transporting the aggregated value, may be defined in the same way as the interest message itself, meaning that the conventional data message can be extended in two ways:

1) Data Message with Newly Defined TLV (Sub)Elements:

Using the same logic as for the interest message, this data message could be defined in a way where an aggregated value is carried either in the payload or in the name and the descriptive information is placed in special fields (TLV sub-elements). These fields could contain information about the time of aggregation, the function used, the units of the response value, the number of samples used for the aggregation, and representation format of the data value, for example.

2) Embedding in the Conventional Data Message:

An aggregated value can of course be returned as a normal data value within the payload of a data message. The descriptive information of the aggregate data value is also included in the payload. As mentioned before, a data value may also be included in the name of the data message to be returned, while the descriptive information remains in the payload. Once again, special reserved characters may or may not be used according to the exact application of the scheme. In one example the name of the data message with the aggregated value may look like this:

./North/@Speed/lat{51}/long{45}/85

These extensions are only necessary for the case of semantic aggregation. The results of syntactic aggregation may be returned in a conventional data message.

The interest message that the system uses to request individual data units from the at least one further system may be a conventional interest message or a new TLV type may be defined for this interest message to allow the interest message to request the data unit/value to be placed in the name of the data message to be transmitted in response.

The data message that is used to transmit such an individual data unit may be a conventional data message. Alternatively, for semantic aggregation, the data unit/value may be contained in the name, while the body contains descriptive information such as measurement units of the data and representation format of the data. If the data unit/value is sensitive, homomorphic encryption of the data unit/value may be used.

Apart from extending interest messages to allow for aggregation requests, the interest messages may also provide details about how the requestor wishes to receive the response.

The interest message may also be able to indicate whether the corresponding data message containing the aggregated data should have the response value placed in the payload of the data message (normal operation) or as part of the name of the data message.

It is technically possible to include certain values in the name of the data message. For the purposes of the aggregation scheme this could be beneficial, since in that case, the intermediate or end ICN nodes can access the value of a data message without actually looking into the payload of the message and can thus perform faster and more efficient aggregation. In the case of semantic aggregation, this may be the only way to perform aggregation without the help of the application layer.

Moreover, in the case of sensitive data within the payload of a data message to which intermediate nodes don't have access, the nodes would still be able to read the value included in the name and hence go ahead with the aggregation even though they will not be able to access the rest of the data included in the payload of the data message. If security of data is a concern and only qualified secure nodes are allowed access to certain data, then intermediate non-secure nodes will still be able to perform aggregation as long as some sort of encryption is used such as homomorphic encryption.

In a homomorphic encryption format, data is encrypted in such a way that their value is not accessible to non-authorized nodes, but the non-authorized nodes are still able to use the encrypted data as input for a number of functions (average, min, max, percentiles, etc.) and output the result again homomorphically encrypted. This scheme ensures the privacy of data while at the same time enabling aggregation at all ICN nodes, irrespective of their security clearance.

In an example of homomorphic encryption, three sensors are connected to a system that returns a data aggregation, which is in turn connected to a requester that has requested the average temperature from 3 sensors. To perform semantic aggregation, the aggregator requests sensor data from each of 3 sensors (e.g. /latitude/40/longitude/35/temperature, /latitude/40/longitude/36/temperature, and /latitude/40/longitude/34/temperature), specifying that the sensor value shall be put in the name of the returning data message. To protect confidentiality of the sensor value, each sensor encrypts the data value before putting it in the name. In order to allow the aggregator to still be able to compute the aggregate, homomorphic encryption is used. Pallier encryption (Paillier, Pascal, "*Public-Key Cryptosystems Based on Composite Degree Residuosity Classes*", EUROCRYPT, 1999, Springer. pp. 223-238) may be used, for example. Paillier encryption allows one to execute additions in the encrypted domain by multiplication of the ciphertexts. Hence, the following property of Paillier encryption can be used:

$$\text{Dec}((\text{Enc}(m_1)*\text{Enc}(m_2))\bmod n^2)=m_1+m_2,$$

where Enc and Dec are the associated encryption and decryption functions.

In this example, a public key (n, g) is used with the values n=5*7=35 and g=2 and a secret key ($\lambda$, $\mu$) is used with the values $\lambda$=lcm(4,6)=12 and $\mu=\lfloor g^\lambda-1 \bmod n^2/n \rfloor^{-1} \bmod n^2=3$.

The following protocol may be used:

Step 1: The requester generates a private-public key pair by using the key generation algorithm of the Paillier encryption scheme, e.g. public key (35,2) and secret key (12,3).

Step 2: The requester queries for the total sum of all the temperature values, by sending the request and (optionally) the public key to the aggregator. Alternatively the sensors may already know the value of the public key to use for encrypting the data.

Step 3: The sensors encrypt their value using the Paillier encryption scheme and the public key they just received. For example, the first sensor encrypts plain text 3 as cipher text 542, the second sensor encrypts plain text 4 as cipher text 1084 and the third sensor encrypts plain text 6 as cipher text 661.

Step 4: The resulting ciphertexts are sent to the aggregator.

Step 5: The system performing the aggregation calculates the aggregate with the formula: $(Enc(m_1)*Enc(m_2))$ mod $n^2$ and sends the resulting ciphertext to the requester. For example, the system calculates the resulting ciphertext as: mod $(542*1084*661, n^2)=383$.

Step 6: The requester decrypts the received ciphertext using the private key and obtains the sum of the temperature values of the three sensors. Then it divides this value by 3 to obtain the average it needs. For example, the requestor calculates the sum as: $Dec(\lambda,\mu, n)(383)=13$, and then divides 13 by 3 to obtain the average of 4.33 (rounded to two decimal places).

In the above example, small prime numbers were used for p and q for explanatory purposes. In a real scheme these numbers would normally be much bigger to guarantee the robustness of the encryption scheme. Furthermore, in this example, the system performing the aggregation needs to know the value of n in order to compute the aggregate in step 5. The value of n may be communicated to the aggregator by either the requester or (one of) the sensors. Alternatively, the aggregator may compute only the multiplication of the encrypted values without the mod operation, which is then left to the requester.

Alternatively, other schemes that support both addition and division functions, which are needed for calculating an average, may be used. An example of such a homomorphic encryption scheme would be NTRU.

The indication of whether a data value (aggregated or not) should appear as part of the name of the corresponding data message, could take place in the following ways:

a. In the case of a newly defined TLV element, one of the fields of the interest message could be used to indicate this. It could even be realized in the form of a one bit flag (e.g. if a certain bit is set to 0 then the data value is carried in the payload, while if it is set to 1 it is carried in the name). In the case of a newly defined TLV element, the solution of this issue is very straightforward.

b. If the interest message is a conventional interest message, then a special character could be used to indicate in the name, the preference of where to include the data value. This option could also be defined as a default and non-default alternative which means that if no special flag/character is used in the name of an interest message then the default operation would be to respond with a data message containing the data value in the payload. On the other hand if a flag/special character is included then the data value is to be displayed in the name of the data message. Using the previous example:

/North/@Speed/lat{51}/long{45}/#DD#/%"Sem.", "Avg","$T_0$-120sec","Time Critical"%

In the above example the flag "#DD#" has been used which indicates that the Data Display field is set to 1 and that the data value should be included in the name of the data message. The above interest message could result in a data message with the following name:

./North/@Speed/lat{51}/long{45}/85

In this case the aggregation value which is generated as response is 85. This value has been calculated while adhering to the aggregation parameters mentioned in the interest message. Descriptive information about this value (e.g. whether it is kph or mph, how many samples where used, etc.) may be placed in the payload of the data message.

The above is necessary when a semantic aggregation is requested. In the case of syntactic aggregation the mentioning of the value in the name is not necessary, since the intermediate nodes performing the aggregation do not need to know the values.

Figure 5:
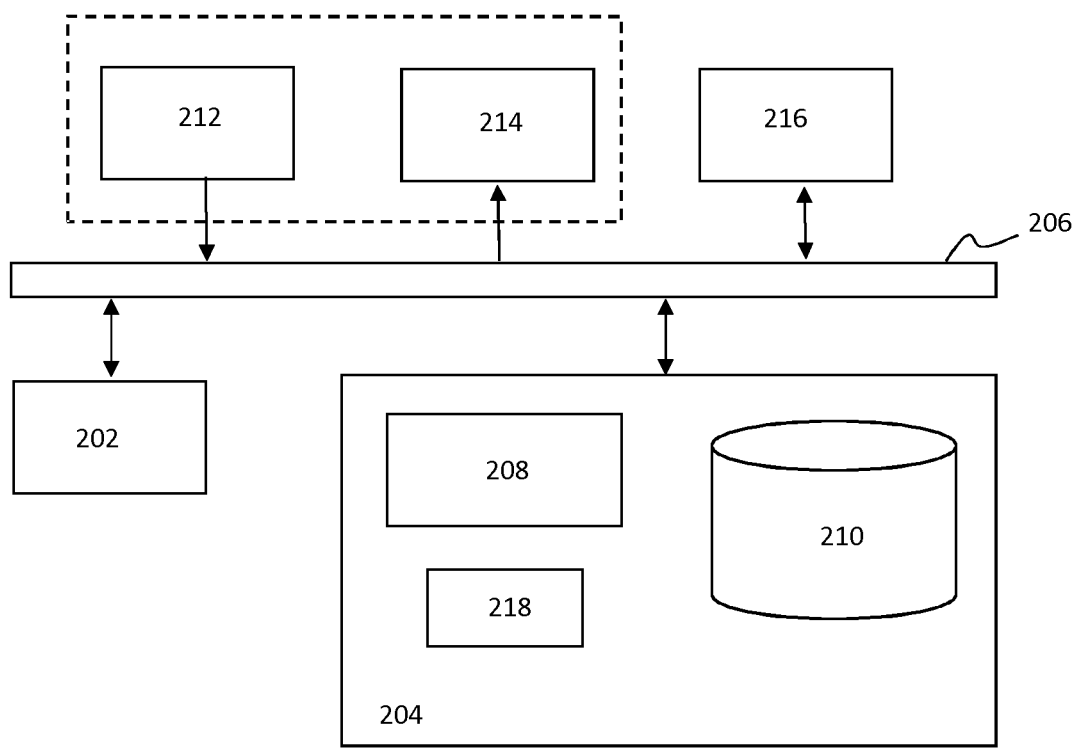
FIG. 5 is a block diagram of an exemplary data processing system for performing the methods of the invention.

FIG. 5 depicts a block diagram illustrating an exemplary data processing system that may perform the methods as described with reference to FIGS. 3 and 4.

As shown in FIG. 5, the data processing system 200 may include at least one processor 202 coupled to memory elements 204 through a system bus 206. As such, the data processing system may store program code within memory elements 204. Further, the processor 202 may execute the program code accessed from the memory elements 204 via a system bus 206. In one aspect, the data processing system may be implemented as a computer that is suitable for storing and/or executing program code. It should be appreciated, however, that the data processing system 200 may be implemented in the form of any system including a processor and a memory that is capable of performing the functions described within this specification.

The memory elements 204 may include one or more physical memory devices such as, for example, local memory 208 and one or more bulk storage devices 210. The local memory may refer to random access memory or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

Input/output (I/O) devices depicted as an input device 212 and an output device 214 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 5 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 200, and a data transmitter for transmitting data from the data processing system 200 to said systems, devices and/or networks. Modems, cable modems, and Ethernet cards are examples of different types of network adapter that may be used with the data processing system 200.

As pictured in FIG. 5, the memory elements 204 may store an application 218. In various embodiments, the application 218 may be stored in the local memory 208, the one or more bulk storage devices 210, or separate from the local memory and the bulk storage devices. It should be appreciated that the data processing system 200 may further execute an operating system (not shown in FIG. 5) that can facilitate execution of the application 218. The application 218, being implemented in the form of executable program code, can be executed by the data processing system 200, e.g., by the processor 202. Responsive to executing the application, the data processing system 200 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 202 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention.

The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for receiving an interest message, comprising: processing means configured to:
   receive, in an information centric networking architecture, an interest message from a sender, the interest message specifying criteria identifying data units from an area of interest which are to be aggregated and comprising at least one parameter specifying how the data units are requested to be aggregated, the interest message further comprising an indication whether a response is to be placed in a name or in a payload of a data message;
   determine whether the system will return an aggregation of data units matching the criteria; and
   return the data message comprising an aggregation of data units matching the criteria to the sender if the processing means have determined that the system will return an aggregation of data units matching the criteria, the data units being aggregated in the data message in dependence on how the data units were requested to be aggregated.

2. The system as claimed in claim 1, wherein the processing means are configured to forward the interest message to another system if the processing means have determined that the system will not return an aggregation of data units matching the criteria.

3. The system as claimed in claim 1, wherein the at least one parameter specifies whether the aggregation is requested to comprise a sequence of the data units or to comprise a result of an aggregation function being performed on the data units.

4. The system as claimed in claim 1, wherein the at least one parameter identifies the aggregation function.

5. The system as claimed in claim 4, wherein the aggregation function is at least one of: count, maximum, median, average, minimum, most often appearing value, probability distribution, or percentage of cumulative distribution.

6. The system as claimed in claim 1, wherein the processing means are configured to include information in the data message describing how and/or when the aggregation of the data units was performed.

7. The system as claimed in claim 1, wherein the processing means are configured to obtain at least one of the data units from at least one further system.

8. The system as claimed in claim 7, wherein obtaining the at least one of the data units from the at least one further system comprises transmitting one or more interest messages for the at least one of the data units to the at least one further system, the one or more interest messages instructing the at least one further system to include the at least one of the data units in the name of one or more data messages.

9. The system as claimed in claim 1, wherein the interest message specifies a time frame within which the aggregation of data units matching the criteria needs to be returned to the sender and the processing means are configured to determine whether the system is able to return the data message comprising the aggregation of data units matching the criteria to the sender within the specified time frame.

10. The system as claimed in claim 1, wherein the interest message specifies a minimum amount of data units matching the criteria that should be aggregated and the processing means are configured to determine whether the system is able to return the data message comprising the aggregation of at least the minimum amount of data units matching the criteria.

11. The system as claimed in claim 1, wherein the processing means are configured to receive a data message and extract a data unit from the name of the received data message.

12. A system for transmitting an interest message, the system comprising:
   one or more processors and memory; and memory storing instructions that, when executed by the one or more processors, cause the system to carry out operations including:

transmitting, in an information centric networking architecture, an interest message, the interest message specifying criteria identifying data units from an area of interest which are to be aggregated and comprising at least one parameter specifying how the data units are requested to be aggregated, the interest message further comprising an indication whether a response is to be placed in a name or in a payload of a data message comprising an aggregation of data units matching the criteria.

13. A method of receiving an interest message, comprising:

receiving, on a system in an information centric networking architecture, an interest message from a sender, the interest message specifying criteria identifying data units from an area of interest which are to be aggregated and comprising at least one parameter specifying how the data units are requested to be aggregated, the interest message further comprising an indication whether a response is to be placed in a name or in a payload of a data message;

determining whether the system will return an aggregation of data units matching the criteria; and returning the data message comprising an aggregation of data units matching the criteria to the sender if it has been determined that the system will return an aggregation of data units matching the criteria, the data units being aggregated in the data message in dependence on how the data units were requested to be aggregated.

14. A method of transmitting an interest message, comprising:

transmitting, in an information centric networking architecture, an interest message, the interest message specifying criteria identifying data units from an area of interest which are to be aggregated and comprising at least one parameter specifying how the data units are requested to be aggregated, the interest message further comprising an indication whether a response is to be placed in a name or in a payload of a data message comprising an aggregation of data units matching the criteria.

15. A non-transient computer-readable medium having instructions stored thereon that, when executed by one or more processors of a system, cause the system to carry out operations for receiving an interest message, the operations including:

receiving, in an information centric networking architecture, an interest message from a sender, the interest message specifying criteria identifying data units from an area of interest which are to be aggregated and comprising at least one parameter specifying how the data units are requested to be aggregated, the interest message further comprising an indication whether a response is to be placed in a name or in a payload of a data message;

determining whether the system will return an aggregation of data units matching the criteria; and returning the data message comprising an aggregation of data units matching the criteria to the sender if it has been determined that the system will return an aggregation of data units matching the criteria, the data units being aggregated in the data message in dependence on how data units were requested to be aggregated.

16. A non-transient computer-readable medium having instructions stored thereon that, when executed by one or more processors of a system, cause the system to carry out operations for transmitting an interest message, the operations including:

transmitting, in an information centric networking architecture, an interest message, the interest message specifying criteria identifying data units from an area of interest which are to be aggregated and comprising at least one parameter specifying how the data units are requested to be aggregated, the interest message further comprising an indication whether a response is to be placed in a name or in a payload of a data message comprising an aggregation of data units matching the criteria.

* * * * *